US012781708B2

(12) United States Patent
Zhou et al.

(10) Patent No.: US 12,781,708 B2
(45) Date of Patent: Nov. 3, 2026

(54) FLOATING WIND TURBINE FOUNDATION, FLOATING WIND TURBINE, ANTI-TYPHOON METHOD AND WIND POWER GENERATION METHOD

(71) Applicants: HUANENG CLEAN ENERGY RESEARCH INSTITUTE, Beijing (CN); HUANENG OFFSHORE WIND POWER SCI&TEC RESEARCH CO, Yancheng (CN)

(72) Inventors: Yiming Zhou, Beijing (CN); Weidong Li, Beijing (CN); Xiaojiang Guo, Beijing (CN); Xin Liu, Beijing (CN); Shu Yan, Beijing (CN)

(73) Assignees: HUANENG CLEAN ENERGY RESEARCH INSTITUTE, Beijing (CN); HUANENG OFFSHORE WIND POWER SCI&TECH RESEARCH CO., LTD, Yancheng (CN)

(*) Notice: Subject to any disclaimer, the term of this patent is extended or adjusted under 35 U.S.C. 154(b) by 219 days.

(21) Appl. No.: 18/837,190

(22) PCT Filed: Sep. 7, 2022

(86) PCT No.: PCT/CN2022/117499
§ 371 (c)(1),
(2) Date: Aug. 9, 2024

(87) PCT Pub. No.: WO2023/155421
PCT Pub. Date: Aug. 24, 2023

(65) Prior Publication Data
US 2025/0188909 A1 Jun. 12, 2025

(30) Foreign Application Priority Data
Feb. 21, 2022 (CN) ........................ 202210157608.X

(51) Int. Cl.
*F03D 13/25* (2016.01)
*B63B 35/44* (2006.01)
*F03D 17/00* (2016.01)

(52) U.S. Cl.
CPC ............ *F03D 13/256* (2023.08); *B63B 35/44* (2013.01); *F03D 17/022* (2023.08); *B63B 2035/446* (2013.01); *B63B 2207/02* (2013.01)

(58) Field of Classification Search
CPC ...... F03D 13/256; F03D 13/25; F03D 17/022; B63B 35/44; B63B 35/446; B63B 2207/02
See application file for complete search history.

(56) References Cited

U.S. PATENT DOCUMENTS

| | | | | |
|---|---|---|---|---|
| 9,822,767 | B2 * | 11/2017 | Numajiri | F03D 80/00 |
| 9,964,097 | B2 * | 5/2018 | Dagher | F03D 13/25 |
| 10,180,129 | B2 * | 1/2019 | Couchman | F03D 7/02 |

FOREIGN PATENT DOCUMENTS

| | | | |
|---|---|---|---|
| CN | 107472474 | A | 12/2017 |
| CN | 109185025 | A | 9/2018 |

(Continued)

*Primary Examiner* — Michael L Sehn
(74) *Attorney, Agent, or Firm* — Ming Jiang; OPENPTO US LLC

(57) ABSTRACT

The disclosure provides a floating wind turbine foundation, a floating wind turbine, an anti-typhoon method and a wind power generation method. The floating wind turbine foundation includes a tower foundation, multiple floats arranged around the tower foundation, and telescopic expansion mechanisms. Each of the floats corresponds to one of the telescopic expansion mechanisms, and each of the telescopic expansion mechanisms includes hydraulic jacks and a folding hinge. Two ends of each of the hydraulic jacks are respectively hinged with the tower foundation and corresponding one of the floats, and the folding hinge includes multiple mutually hinged folding arms, and two ends of the (Continued)

folding hinge are respectively hinged with the tower foundation and corresponding one of the floats.

20 Claims, 11 Drawing Sheets

(56) References Cited

FOREIGN PATENT DOCUMENTS

| | | | |
|---|---|---|---|
| CN | 110671262 | A1 | 11/2019 |
| CN | 111042978 | A | 4/2020 |
| CN | 213175924 | U | 5/2021 |
| CN | 114526201 | A | 5/2022 |
| ES | 2496390 | A1 | 9/2014 |

* cited by examiner

FLOATING WIND TURBINE FOUNDATION, FLOATING WIND TURBINE, ANTI-TYPHOON METHOD AND WIND POWER GENERATION METHOD

CROSS-REFERENCE TO RELATED APPLICATIONS

This application is a continuation of PCT/CN2022/117499, filed Sep. 7, 2022 and claims priority of Chinese Patent Application No. 202210157608.X, filed on Feb. 21, 2022, the contents of which are hereby incorporated by reference.

TECHNICAL FIELD

The disclosure relates to the technical field of floating wind turbine foundations, in particular to a floating wind turbine foundation, a floating wind turbine, an anti-typhoon method and a wind power generation method.

BACKGROUND

The coastal areas in our country are rich in wind resources, but they are also typhoon-prone areas. Because typhoons have the characteristics of high wind speed and sudden change in wind direction, they may cause damage to the blades, engine rooms and foundation settings of wind turbine units. Therefore, wind turbine units usually adopt the way of strengthening the structural strength of floating foundations and wind turbine to achieve anti-typhoon, which is generally called hard lifting, but this leads to excessive redundancy in structural design of wind turbine units and increases the manufacturing cost of wind turbine units.

Therefore, how to reduce the manufacturing cost of wind turbine units under the premise of meeting the demand of anti-typhoon is a technical problem that needs to be solved by those skilled in this field at present.

SUMMARY

The purpose of the disclosure is to provide a floating wind turbine foundation, so as to reduce the manufacturing cost of wind turbine units on the premise of meeting the requirements of anti-typhoon.

In order to achieve the above purpose, the disclosure provides a floating wind turbine foundation, which includes:

- a tower foundation;
- multiple floats arranged around the tower foundation;
- telescopic expansion mechanisms, where each of the floats corresponds to one of the telescopic expansion mechanisms, and each of the telescopic expansion mechanisms includes hydraulic jacks and a folding hinge, where two ends of each of the hydraulic jacks are respectively hinged with the tower foundation and corresponding one of the floats, and the folding hinge includes multiple mutually hinged folding arms, and two ends of the folding hinge are respectively hinged with the tower foundation and corresponding one of the floats.

Preferably, in the above floating wind turbine foundation, further including a controller for receiving weather information, where the controller is electrically connected with each of the hydraulic jacks.

Preferably, in the above floating wind turbine foundation, further including an inclinometer capable of detecting an inclination angle of a wind turbine, a wind detecting radar capable of detecting a wind speed and a floating sonar measuring device capable of detecting a wave height, where the inclinometer, the wind detecting radar and the floating sonar measuring device are all electrically connected with the controller.

Preferably, in the above floating wind turbine foundation, further including a water pump for increasing ballast water of the floats.

A floating wind turbine, including a tower, a wind turbine arranged on the tower and a floating wind turbine foundation according to any one of the above, where the tower is arranged on the floating wind turbine foundation.

Preferably, in the above floating wind turbine, the tower is of a lifting structure.

Preferably, in the above floating wind turbine, the lifting structure includes lifting driving gears arranged on the tower foundation, and an outer circumference of the tower is provided with lifting teeth capable of being matched with the lifting driving gears.

Preferably, in the above floating wind turbine, the wind turbine includes a hub and blades arranged on the hub, and each of the blades includes a first blade split connected with the hub and a second blade split rotatably connected with the first blade split.

An anti-typhoon method is provided and is applied to a floating wind turbine foundation according to any one of the above, including following steps:

step S1: when the floating wind turbine is in typhoon condition, extending a telescopic rod of each of the hydraulic jacks, and unfolding the folding hinge to increase the distance between each of the floats and the tower foundation.

Preferably, in the above-mentioned anti-typhoon method, it further includes step SA1 before the step S1;

- step SA1: receiving the weather information to control a telescopic action of each of the hydraulic jacks according to the weather information.

Preferably, in the above-mentioned anti-typhoon method, step SA1 includes:

- step SA1-1: detecting the inclination angle of the wind turbine through the inclinometer, detecting the wind speed through the wind detecting radar, and detecting the wave height through the floating sonar measuring device;
- step SA1-2: when the inclination angle of the wind turbine exceeds a inclination angle threshold, the wind speed exceeds a wind speed threshold and/or the wave height exceeds a wave height threshold, sending unfolding instructions by the controller;
- step SA1-3: after the hydraulic jacks receive the unfolding instructions, extending the telescopic rod of each of the hydraulic jacks.

A wind power generation method includes the anti-typhoon method described in any one of the above.

When the floating wind turbine foundation provided by the disclosure is used, multiple floats are arranged around the tower foundation, and the two ends of the hydraulic jack are respectively hinged with the tower foundation and the float, and the folding hinge includes multiple mutually hinged folding arms, and the two ends of the folding hinge are respectively hinged with the tower foundation and the float. Therefore, when the wind turbine is in a non-typhoon working condition, the telescopic rod of the hydraulic jack is retracted, so that the telescopic rod of the hydraulic jack drives the float to move to a position close to the tower foundation, As the float moves to the position close to the tower foundation, the plurality of folding arms of the folding hinge are folded together with each other, which reduces the waterline surface area of the floating wind turbine foundation, reduces the wave load on the floating wind turbine foundation and improves the stability of the floating wind turbine foundation. When the typhoon comes, the telescopic rod of the hydraulic jack is extended, so that the telescopic rod of the hydraulic jack drives the floats to move away from the tower foundation. As the floats move away from the tower foundation, multiple folding arms of the folding hinge are unfolded, which increases the restoring moment of the floating wind turbine foundation and enhances the stability of the floating wind turbine foundation. Therefore, the floating wind turbine foundation provided by the disclosure can improve the connection stability between the floats and the tower foundation through the folding hinge, and realize the unfolding and telescopic of the floats through the telescopic of the hydraulic jack. Compared with the traditional floating foundation, it not only meets the requirements of anti-typhoon, but also reduces the redundancy of the floating wind turbine foundation and reduces the manufacturing cost of the wind turbine units.

BRIEF DESCRIPTION OF THE DRAWINGS

In order to more clearly explain the embodiments of the disclosure or the technical scheme in the prior art, the drawings needed to be used in the description of the embodiments or the prior art will be briefly introduced below. Obviously, the drawings in the following description are only some embodiments of the disclosure, and other drawings can be obtained according to these drawings without creative work for ordinary skilled in the field.

Figure 1:
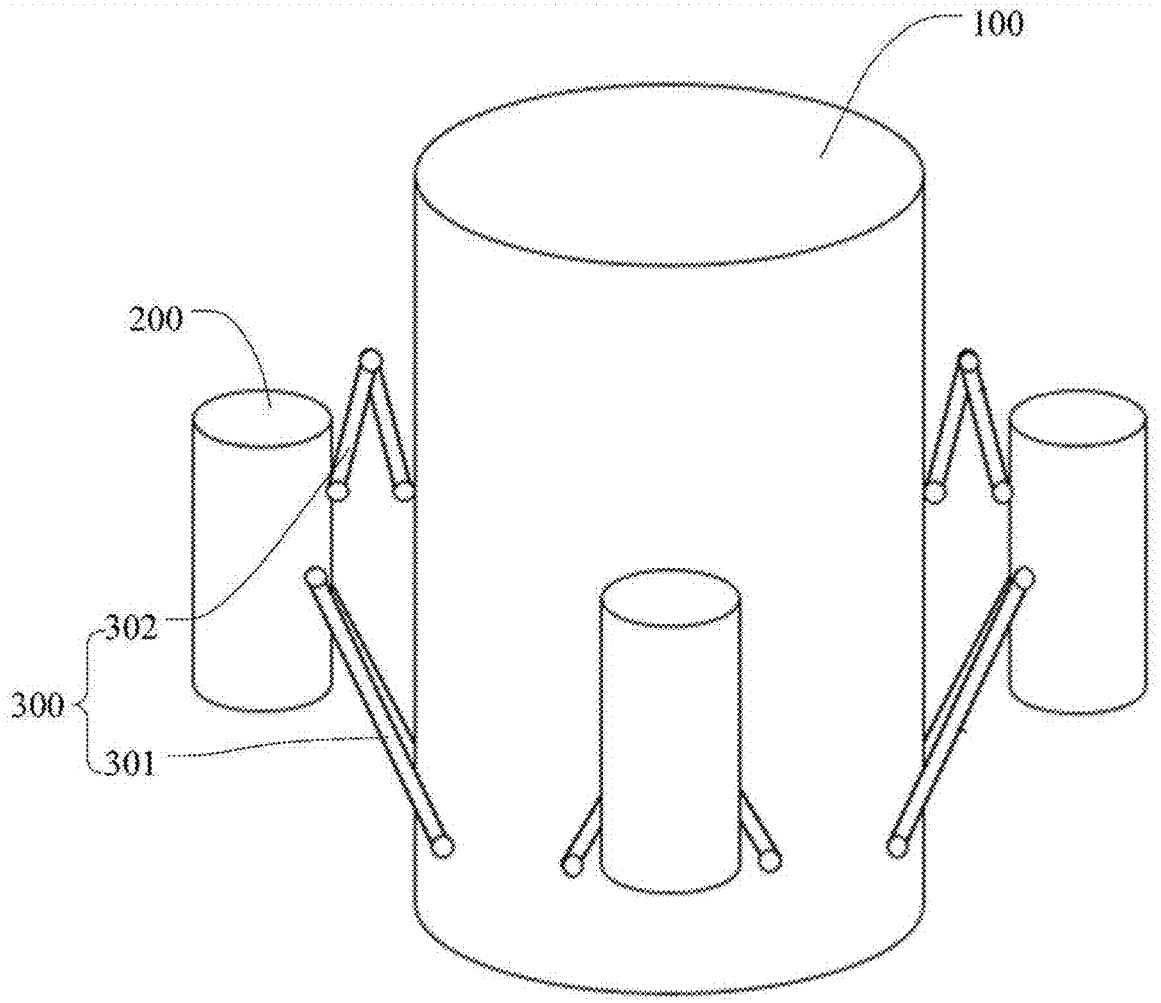
FIG. 1 is a schematic structural diagram of a floating wind turbine foundation in a non-typhoon working condition according to an embodiment of the disclosure.
Figure 2:
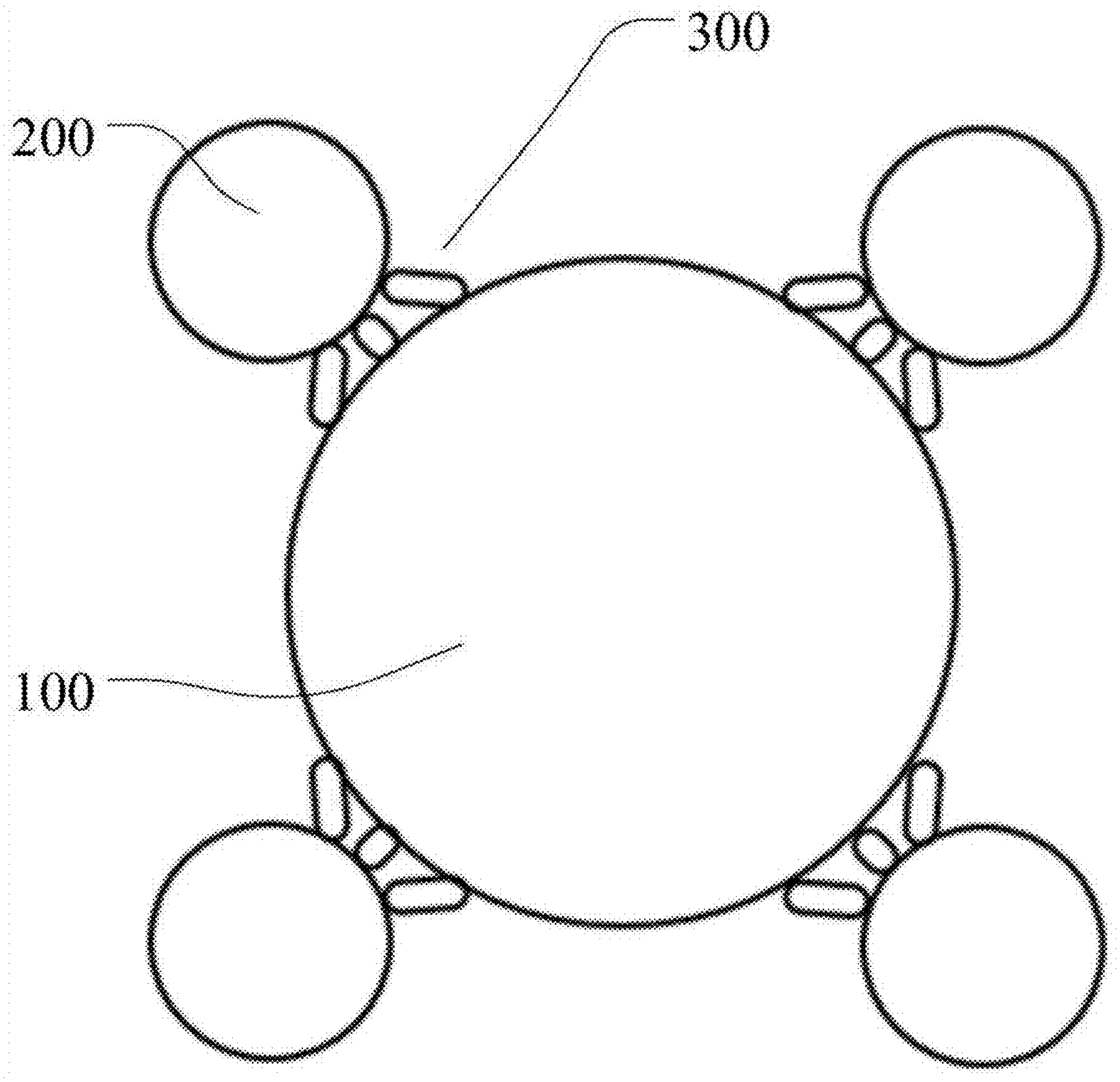
FIG. 2 is a schematic structural diagram in a top view of the floating wind turbine foundation in a non-typhoon working condition according to an embodiment of the disclosure.
Figure 3:
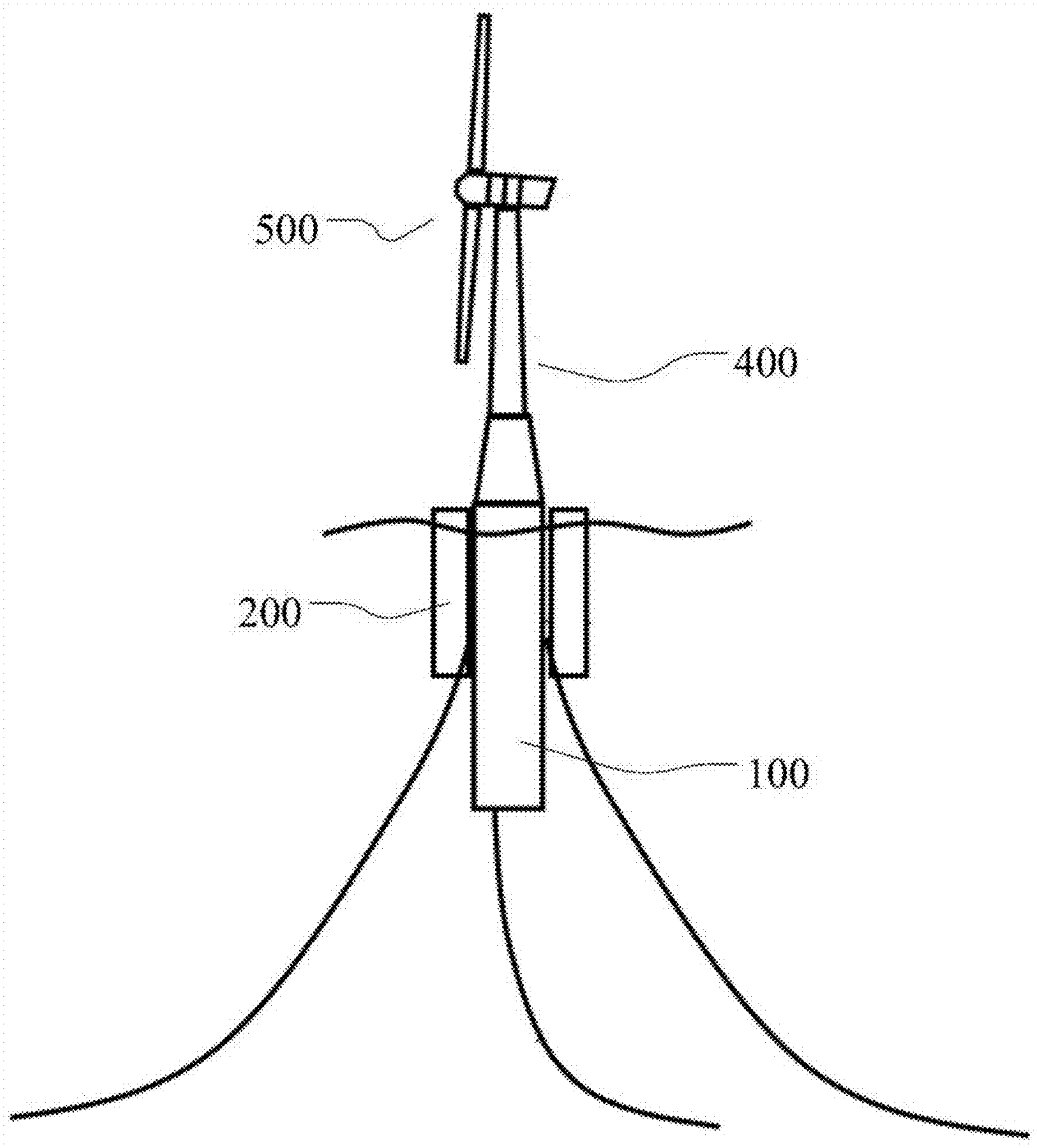
FIG. 3 is a schematic structural diagram of a floating wind turbine in a non-typhoon working condition according to an embodiment of the disclosure.

List of reference characters: 100 tower foundation; 101 lifting driving gear; 200 float; 201 reducing shaking plate; 300 telescopic expansion mechanism; 301 hydraulic jack; 302 folding hinge; 400 tower; 401 lifting tooth; 500 wind turbine; 501 hub; 502 blade; 5021 first blade split; and 5022 second blade.

DETAILED DESCRIPTION OF THE EMBODIMENTS

In view of this, the core of the disclosure is to provide a floating wind turbine foundation, so as to reduce the manufacturing cost of wind turbine units on the premise of meeting the requirements of anti-typhoon.

In the following, the technical scheme in the embodiment of the disclosure will be clearly and completely described with reference to the attached drawings in the embodiment of the disclosure. Obviously, the described embodiment is only a part of the embodiment of the disclosure, but not all of the embodiment. Based on the embodiments in the disclosure, all other embodiments obtained by ordinary skilled in the field without creative efforts belong to the scope of protection of the disclosure.

As shown in FIGS. 1 to 11, the embodiment of the disclosure provides a floating wind turbine foundation, which includes a tower foundation 100, floats 200 and telescopic expansion mechanisms 300.

In which, the number of floats 200 is multiple, and multiple floats 200 are arranged around the tower foundation 100. Each float 200 corresponds to a telescopic expansion mechanism 300. The telescopic expansion mechanism 300 includes a hydraulic jack 301, two ends of which are respectively hinged with the tower foundation 100 and the float 200, and a folding hinge 302, which includes multiple mutually hinged folding arms and two ends of which are respectively hinged with the tower foundation 100 and the float 200.

When the floating wind turbine foundation provided by the disclosure is used, multiple floats 200 are arranged around the tower foundation 100, and the two ends of the hydraulic jack 301 are respectively hinged with the tower foundation 100 and the float 200, and the folding hinge 302 includes multiple mutually hinged folding arms, and the two ends of the folding hinge 302 are respectively hinged with the tower foundation 100 and the float 200. Therefore, when the wind turbine 500 is in a non-typhoon working condition, the telescopic rod of the hydraulic jack 301 is retracted, so that the telescopic rod of the hydraulic jack 301 drives the float 200 to move to a position close to the tower foundation 100. As the float 200 moves to the position close to the tower foundation 100, the plurality of folding arms of the folding hinge 302 are folded together with each other, which reduces the waterline surface area of the floating wind turbine foundation, reduces the wave load on the floating wind turbine foundation and improves the stability of the floating wind turbine foundation. When the typhoon comes, the telescopic rod of the hydraulic jack 301 is extended, so that the telescopic rod of the hydraulic jack 301 drives the floats 200 to move away from the tower foundation 100. As the floats 200 move away from the tower foundation 100, multiple folding arms of the folding hinge 302 are unfolded, which increases the restoring moment of the floating wind turbine foundation and enhances the stability of the floating wind turbine foundation. Therefore, the floating wind turbine foundation provided by the disclosure can improve the connection stability between the floats 200 and the tower foundation 100 through the folding hinge 302, and realize the unfolding and telescopic of the floats 200 through the telescopic of the hydraulic jack 301. Compared with the traditional floating foundation, it not only meets the requirements of anti-typhoon, but also reduces the redundancy of the floating wind turbine foundation and reduces the manufacturing cost of the wind turbine units.

Figure 4:
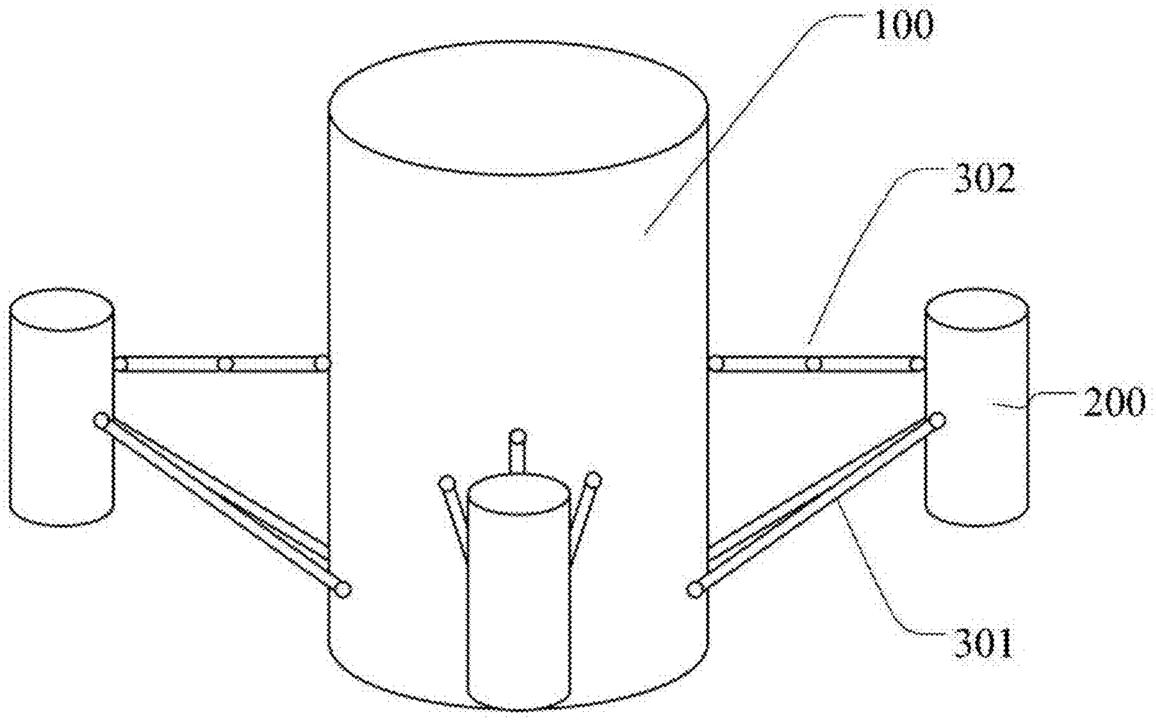
FIG. 4 is a schematic structural diagram of the floating wind turbine foundation in a typhoon working condition according to an embodiment of the disclosure.
Figure 5:
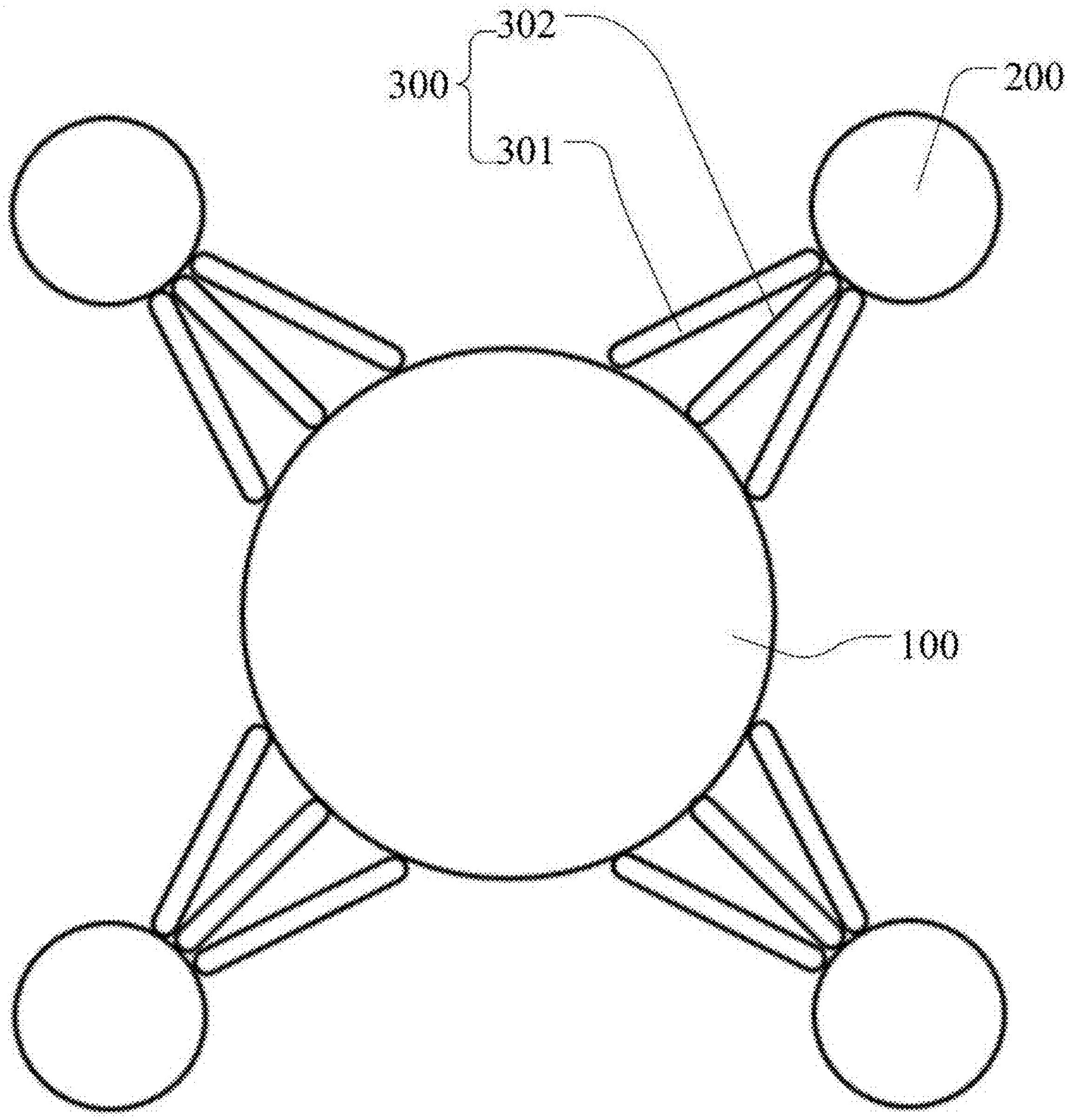
FIG. 5 is a schematic structural diagram in a top view of the floating wind turbine foundation in a typhoon working condition according to an embodiment of the disclosure.
Figure 6:
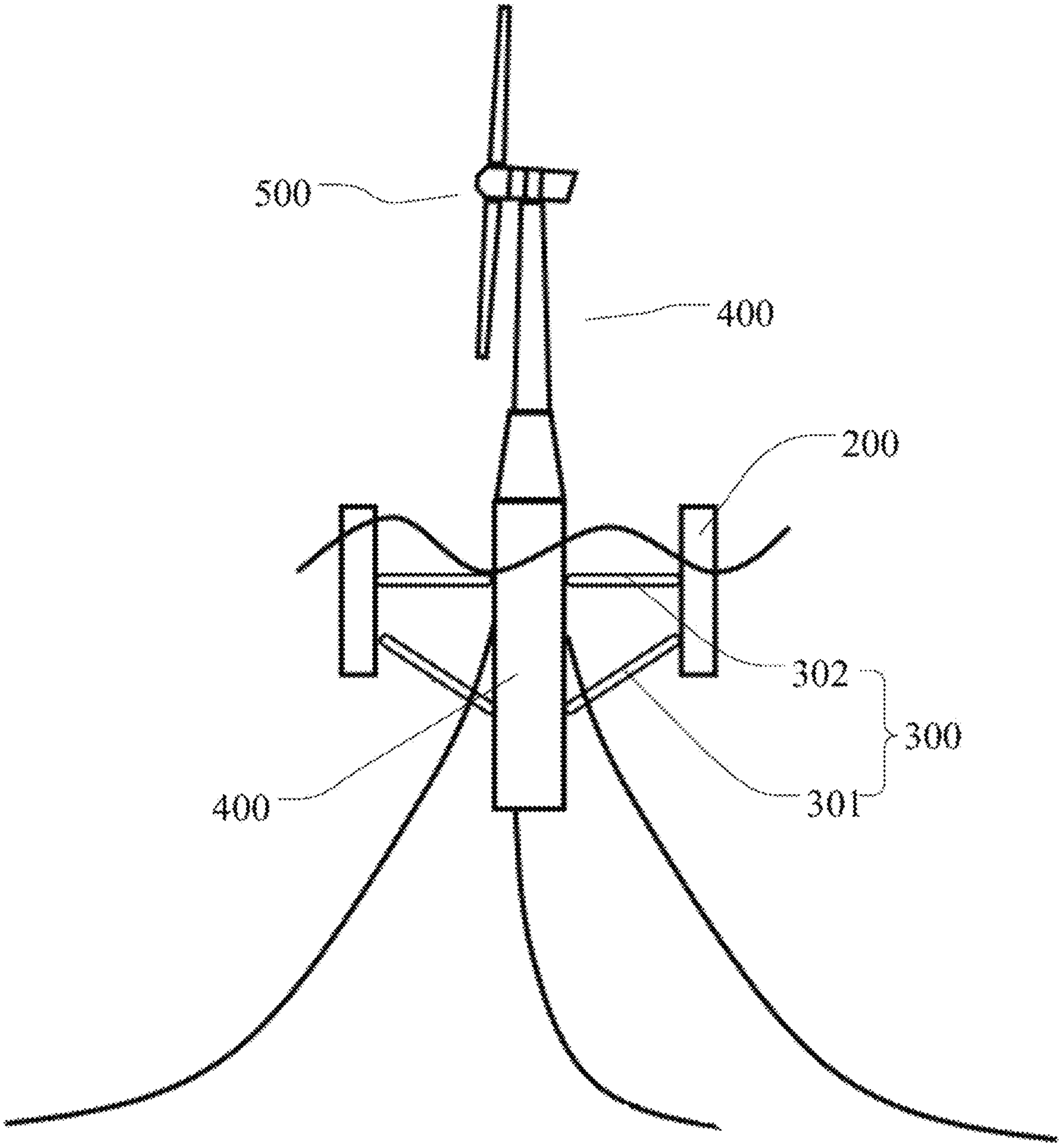
FIG. 6 is a schematic structural diagram of the floating wind turbine in a typhoon working condition according to an embodiment of the disclosure.

It should be noted that each telescopic expansion mechanism 300 can have one hydraulic jack 301 and one folding hinge 302, or multiple hydraulic jacks 301 and/or multiple folding hinges 302, as long as the number can meet the use requirements, it is within the protection scope of the disclosure. Optionally, as shown in FIGS. 4 to 6, in the embodiment of the disclosure, the number of hydraulic jacks 301 is two, and the telescopic rods of the hydraulic jacks 301 are obliquely arranged with the axis of the tower foundation 100. The number of folding hinge 302 is one, so that the float 200 can be pushed to a position away from the tower foundation 100 by the hydraulic jacks 301 under typhoon conditions. A stable triangular support structure is formed by one folding hinge 302 and two hydraulic jacks 301, thus further improving the stability of the floating wind turbine foundation under typhoon conditions.

Further, the floating wind turbine foundation also includes a controller for receiving weather information, and the controller is electrically connected with the hydraulic jack 301, so as to receive the weather information through the controller, so that the controller can control the telescopic action of the hydraulic jack 301 according to the weather information.

It should be understood that the above weather information can be the weather forecast information made by the land weather forecast center, and the controller intervenes in the telescopic of the hydraulic jack 301 in advance according to the weather forecast information. When the weather forecast information shows that there is a typhoon warning, the controller controls the hydraulic jack 301 to extend and pushes the float 200 to extend around the tower foundation 100. That is to say, the telescopic expansion mechanism 300 is actively controlled according to the weather forecast information made by the land weather forecast center; or the weather forecast information is real-time weather information detected according to detection components. When the real-time weather information shows that it is in typhoon working condition, the controller controls the hydraulic jack 301 to extend, pushes the float 200 to extend around the tower foundation 100, that is to say, the telescopic extension mechanism 300 is passively controlled according to the real-time weather information.

Optionally, the floating wind turbine foundation provided by the embodiment of the disclosure passively controls the telescopic extension mechanism 300 according to the real-time weather information. The floating wind turbine foundation further includes an inclinometer capable of detecting an inclination angle of a wind turbine, a wind detecting radar capable of detecting a wind speed and a floating sonar measuring device capable of detecting a wave height. The inclinometer, the wind detecting radar and the floating sonar measuring device are all electrically connected with the controller, so as to transmit the detected information such as wind turbine inclination angle, wind speed and wave height to the controller. When the inclination angle of the wind turbine exceeds the inclination angle threshold, the wind speed exceeds the wind speed threshold and/or the wave height exceeds the wave height threshold, the controller sends out the unfolding instruction, and after the hydraulic jack 301 receives the unfolding instruction, the telescopic rod of the hydraulic jack 301 is extended and the folding hinge 302 is deployed, so that the restoring moment of the floating wind turbine foundation is increased and the stability of the whole floating wind turbine is enhanced.

The disclosure does not specifically limit the values of the above-mentioned inclination angle threshold, wind speed threshold and wave height threshold, as long as they can meet the use requirements, they all belong to the protection scope of the disclosure. Optionally, the inclination angle threshold provided by the embodiment of the disclosure is 15 degrees, the wind speed threshold is 117 km/h, and the wave height threshold is 14 m.

Further, the floating wind turbine foundation also includes a water pump, so that the ballast water of the floats 200 can be increased by the water pump, the center of gravity of the floating wind turbine foundation can be lowered, and the typhoon resistance of the floating wind turbine foundation can be improved.

In addition, the disclosure also provides a floating wind turbine, which includes a tower 400, a wind turbine 500 arranged on the tower 400 and a floating wind turbine foundation as mentioned above. The tower 400 is arranged on the floating wind turbine foundation so as to support the tower 400 through the floating wind turbine foundation. As the floating wind turbine contains the floating wind turbine foundation as mentioned above, all technical effects of the floating wind turbine foundation are taken into account, so they are will not repeated here.

In addition, the tower 400 has a lifting structure, so that the center of gravity of the floating wind turbine can be lowered by lifting the tower 400 when facing typhoon conditions, and the typhoon resistance ability of the floating wind turbine can be improved.

It should be understood that the transmission mode of the above-mentioned lifting structure is a lead screw and nut transmission, gear and rack transmission or slider and sliding rail transmission, etc., as long as transmission mode can meet the use requirements, it belongs to the protection scope of the disclosure. Optionally, the embodiment of the disclosure provides a specific lifting structure.

Figure 7:
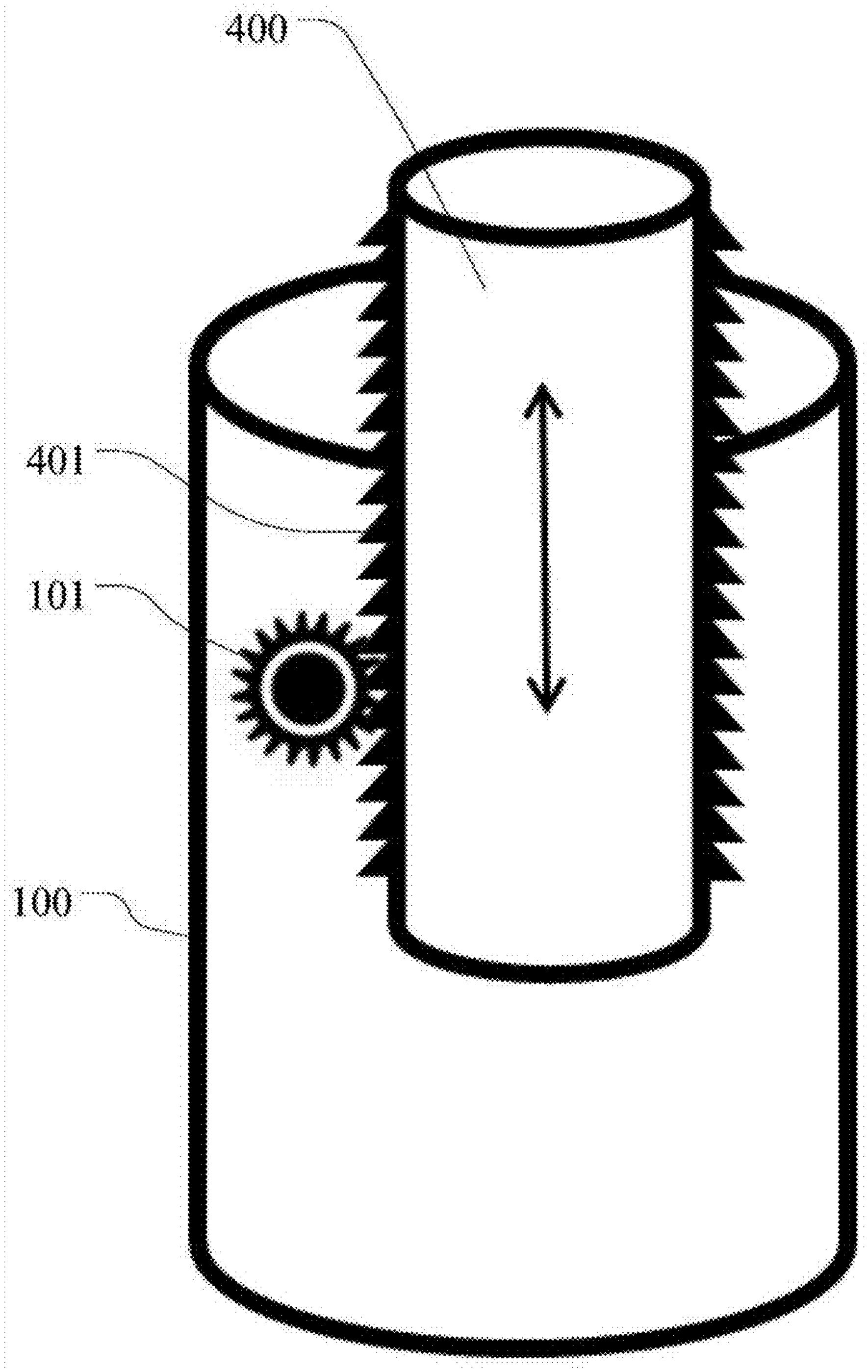
FIG. 7 is a schematic structural diagram of a tower according to an embodiment of the disclosure.

As shown in FIG. 7, the lifting structure includes a lifting driving gear 101 arranged on the tower foundation 100, and the outer circumference of the tower 400 is provided with lifting teeth 401 which can be matched with the lifting driving gear 101, so that the tower 400 can be driven to lift by the lifting driving gear 101. The center of gravity of the floating wind turbine can be lowered by the lifting structure when facing typhoon working conditions, so as to improve the typhoon resistance ability.

It should be understood that the above-mentioned lifting teeth 401 can be components such as racks or toothed belts arranged on the outer circumference of the tower 400, or toothed grooves can be directly machined on the outer circumference of the tower 400. As long as the lifting teeth 401 can be matched with the lifting driving gears 101, the lifting structure is within the protection scope of the disclosure. Moreover, in order to improve the lifting stability, the number of the lifting driving gears 101 is multiple, and multiple lifting driving gears 101 are distributed in a circular array along the circle center of the tower foundation 100.

Figure 8:
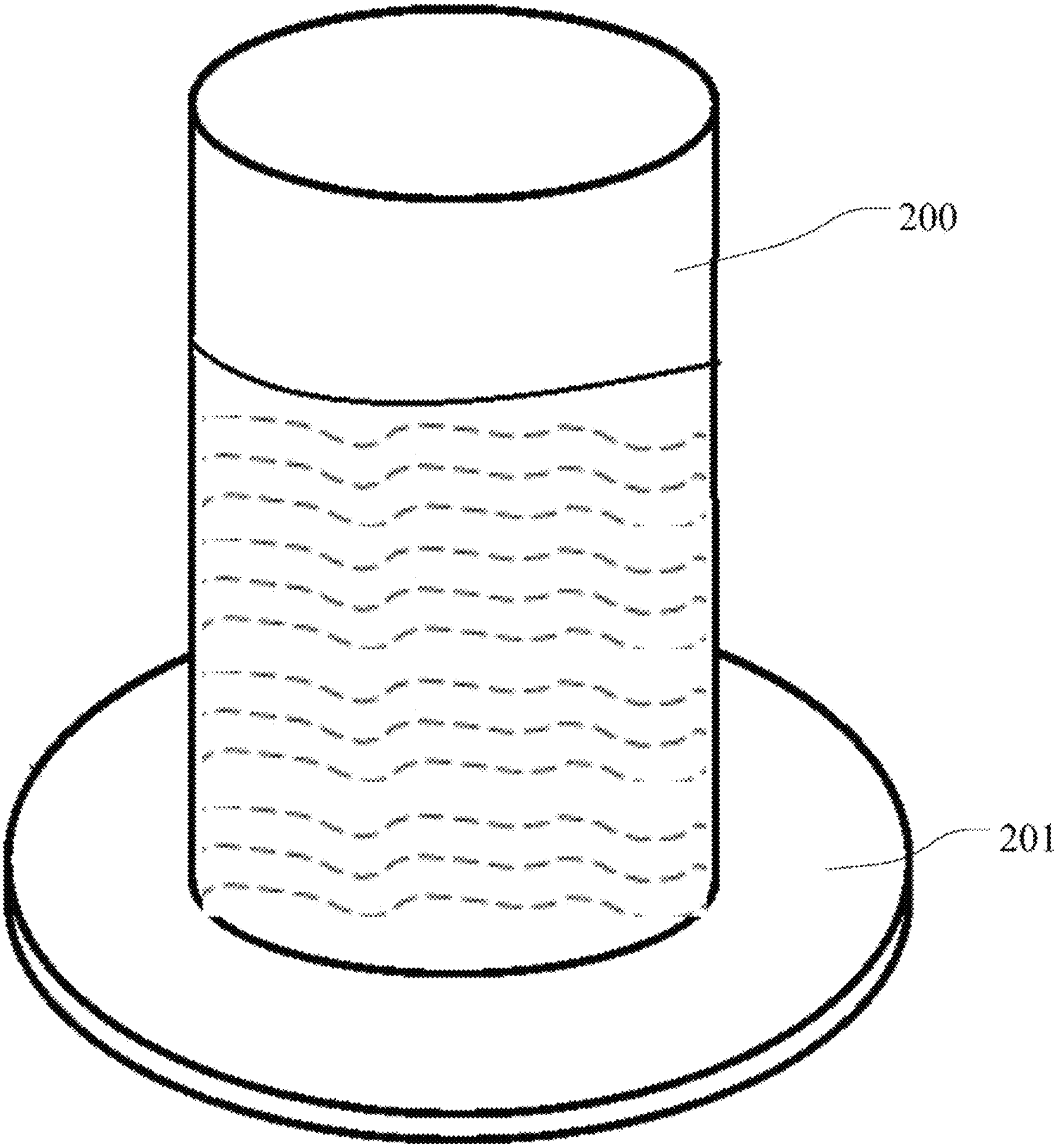
FIG. 8 is a schematic structural diagram of the float according to an embodiment of the disclosure.

As shown in FIG. 8, the bottom of the float is provided with a reducing shaking plate 201, so as to further reduce the center of gravity of the floating wind turbine foundation through the reducing shaking plate 201, so as to reduce the center of gravity of the floating wind turbine and improve the typhoon resistance ability of the floating wind turbine.

Figure 9:
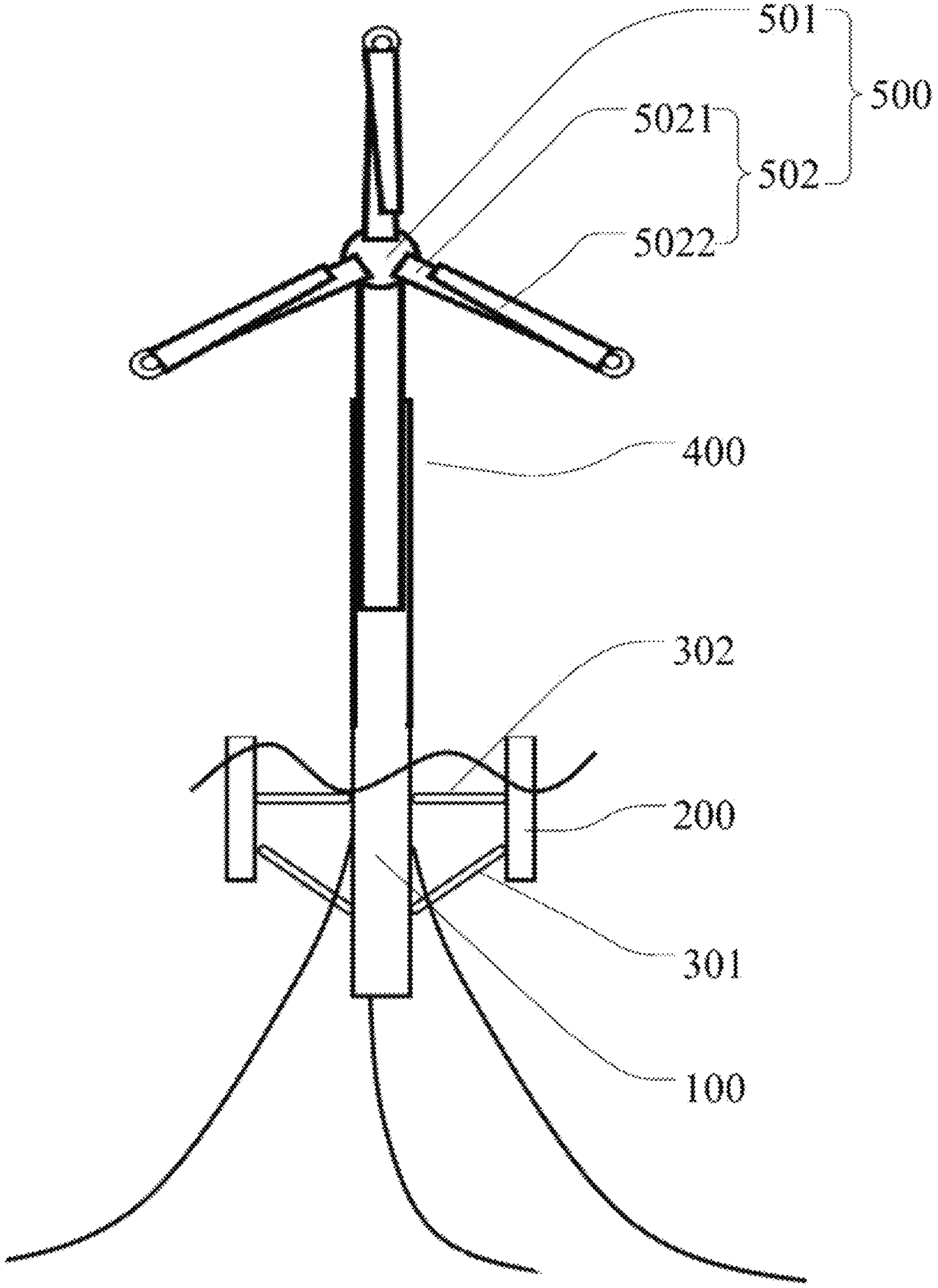
FIG. 9 is a schematic structural diagram of another floating wind turbine in a typhoon working condition according to an embodiment of the disclosure.

As shown in FIG. 9, the wind turbine 500 includes a hub 501 and blades 502 arranged on the hub 501. The blades 502 include a first blade split 5021 connected with the hub 501 and a second blade split 5022 rotatably connected with the first blade split 5021, so as to rotate the second blade split 5022 to coincide with the first blade split 5021 under typhoon conditions, shorten the overall length of the blades 502, and improve the resistance ability of the floating wind turbine.

Figure 10:
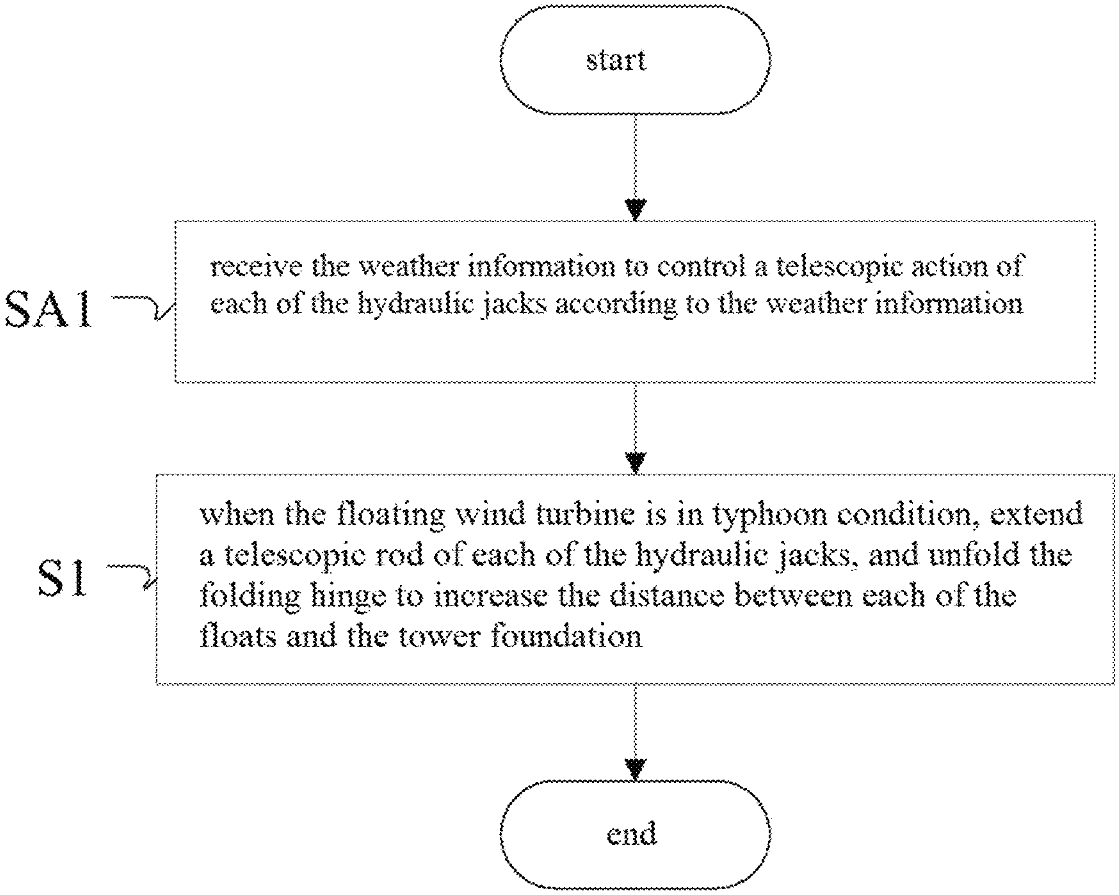
FIG. 10 is a schematic flowchart diagram of an anti-typhoon method according to an embodiment of the disclosure.
Figure 11:
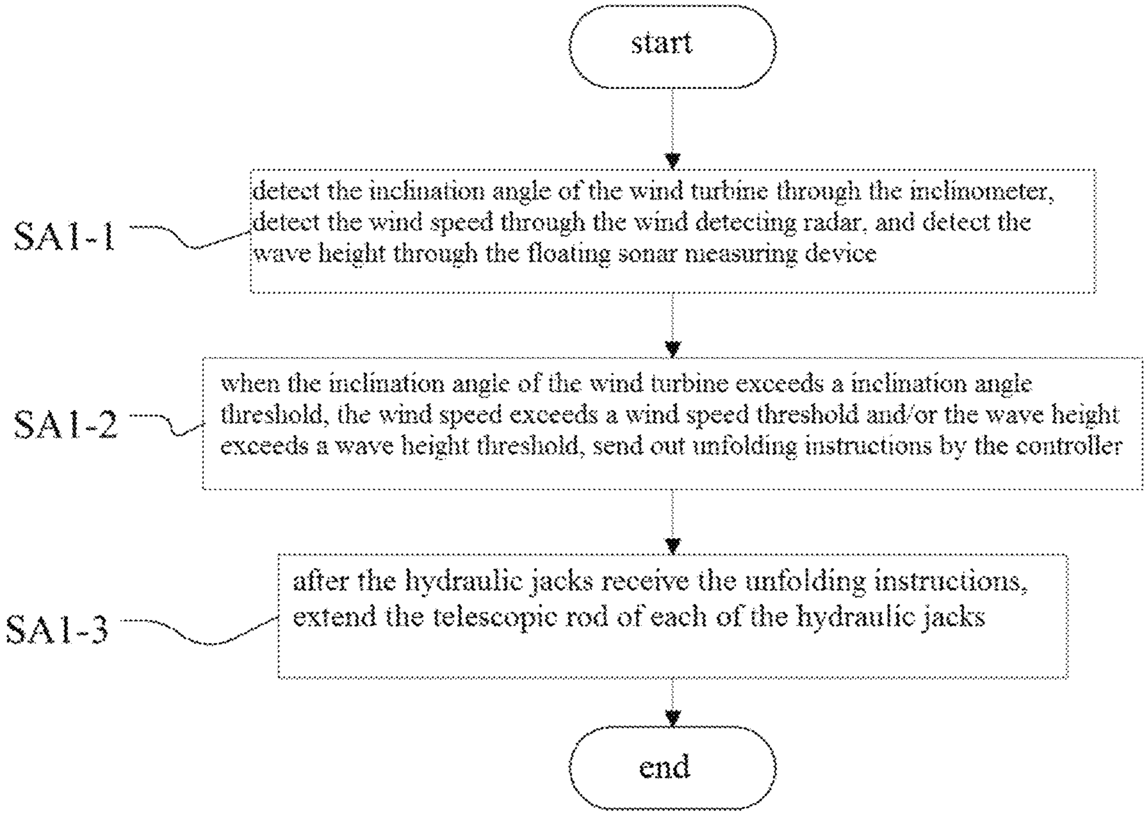
FIG. 11 is a step-by-step schematic flowchart diagram of step SA1 according to an embodiment of the disclosure.

As shown in FIG. 10 to FIG. 11, the disclosure also provides an anti-typhoon method, which is applied to the floating wind turbine foundation as described in any one of the above, and includes the following steps:

step S1: when the floating wind turbine is in typhoon condition, the telescopic rod of the hydraulic jack 301 is extended and the folding hinge 302 is unfolded, so as to increase the distance between the float 200 and the tower foundation 100, increase the restoring moment of the floating wind turbine foundation, and enhance the stability of the floating wind turbine foundation.

It can be seen that the anti-typhoon method provided by the disclosure can improve the connection stability between the float 200 and the tower foundation 100 through the folding hinge 302, and realize the unfolding and telescopic of the buoy 200 through the telescopic of the hydraulic jack 301. Compared with the traditional floating foundation, it not only meets the anti-typhoon requirements, but also reduces the redundancy of the floating wind turbine foundation and the manufacturing cost of the wind turbine.

In addition, the anti-typhoon method also includes the following steps before step S1:

step SA1: the weather information is received to control the telescopic action of the hydraulic jack 301 according to the weather information, so that the restoring moment of the floating wind turbine foundation can be adjusted by the telescopic length of the hydraulic jack 301 under typhoon working conditions, so that the stability of the floating wind turbine foundation is enhanced.

It should be understood that the weather information received in the above step SA1 may be the weather forecast information made by the land weather forecast center. When the weather forecast information shows that there is a typhoon warning, the hydraulic jack 301 is extended to push the floats 200 of the floating wind turbine foundation to extend around the tower foundation 100. That is to say, the telescopic expansion mechanism 300 is actively controlled according to the weather forecast information made by the land weather forecast center; or the weather information is real-time weather information detected according to detection components. When the real-time weather information shows that it is in typhoon working condition, the hydraulic jack 301 is extended to push the floats 200 to extend around the tower foundation 100. That is to say, the telescopic expansion mechanism 300 is passively controlled according to the real-time weather information. Optionally, the weather information received by step SA1 in the anti-typhoon method provided by the embodiment of the disclosure is real-time weather information.

Specifically, Step SA1 Includes:

step SA1-1: the inclination angle of the wind turbine 500 is detected by the inclinometer, the wind speed is detected by wind detecting radar, the wave height is detected by the floating sonar measuring device, and the detected inclination angle, wind speed and wave height are transmitted to the controller, and the controller detects whether the parameters exceed the threshold, that is, to judge whether there is a typhoon coming;

step SA1-2: when the inclination angle of the wind turbine 500 exceeds the inclination angle threshold, the wind speed exceeds the wind speed threshold and/or the wave height exceeds the wave height threshold, that is, when the wind turbine 500 is in a typhoon condition, the controller sends out unfolding instructions to control the extension of the telescopic rod of the hydraulic jack 301;

step SA1-3: after the hydraulic jack 301 receives the unfolding instructions, the telescopic rod of the hydraulic jack 301 is extended to increase the restoring moment of the floating wind turbine foundation and enhance the stability of the floating wind turbine foundation.

It should be understood that in the above step SA1-2, the controller may send out the unfolding instruction when the inclination angle, wind speed and wave height of the wind turbine all exceed the corresponding threshold, or the controller may send out the unfolding instructions when one or both of the inclination angle, wind speed and wave height of the wind turbine exceed the corresponding threshold. In practical application, the judgment condition can be adaptively modified according to the actual demand.

Moreover, the numerical values of the above-mentioned inclination angle threshold, wind speed threshold and wave height threshold are not specifically limited, as long as they can meet the use requirements, they all belong to the protection scope of the disclosure. Optionally, the inclination angle threshold provided by the embodiment of the disclosure is 15 degrees, the wind speed threshold is 117 km/h, and the wave height threshold is 14 m.

In addition, the disclosure also provides a wind power generation method, which includes the anti-typhoon method as described in any one of the above, so it has all the technical effects of the above-mentioned anti-typhoon method, and will not be repeated here.

The terms “first” and “second” in the description and claims of the disclosure and the above drawings are used to distinguish different objects, not to describe a specific order. Furthermore, that term “including” and “have” and any variations thereof are intended to cover non-exclusive inclusion. For example, a process, method, system, product or device that includes a series of steps or units is not set in the listed steps or units, but may include steps or units that are not listed.

The above description of the disclosed embodiments enables those skilled in the art to make or use the disclosure. Many modifications to these embodiments will be obvious to those skilled in the art, and the general principles defined herein can be implemented in other embodiments without departing from the spirit or scope of the disclosure. Therefore, the disclosure is not to be limited to the embodiments shown herein, but is to be accorded the widest scope consistent with the principles and novel features disclosed herein.

What is claimed is:

1. A floating wind turbine foundation, comprising:

a tower foundation;

a plurality of floats arranged around the tower foundation;

telescopic expansion mechanisms, wherein each of the floats corresponds to one of the telescopic expansion mechanisms, and each of the telescopic expansion mechanisms comprises hydraulic jacks and a folding hinge, wherein two ends of each of the hydraulic jacks are respectively hinged with the tower foundation and corresponding one of the floats, and the folding hinge comprises a plurality of mutually hinged folding arms, and two ends of the folding hinge are respectively hinged with the tower foundation and corresponding one of the floats.

2. The floating wind turbine foundation according to claim 1, further comprising a controller for receiving weather information, wherein the controller is electrically connected with each of the hydraulic jacks.

3. The floating wind turbine foundation according to claim 2, further comprising an inclinometer capable of detecting an inclination angle of a wind turbine, a wind detecting radar capable of detecting a wind speed and a floating sonar measuring device capable of detecting a wave height, wherein the inclinometer, the wind detecting radar and the floating sonar measuring device are all electrically connected with the controller.

4. The floating wind turbine foundation according to claim 1, further comprising a water pump for increasing ballast water of the floats.

5. A floating wind turbine, comprising a tower, a wind turbine arranged on the tower and a floating wind turbine foundation, wherein the floating wind turbine foundation comprises:

a tower foundation;

a plurality of floats arranged around the tower foundation;

telescopic expansion mechanisms, wherein each of the floats corresponds to one of the telescopic expansion mechanisms, and each of the telescopic expansion mechanisms comprises hydraulic jacks and a folding hinge, wherein two ends of each of the hydraulic jacks are respectively hinged with the tower foundation and corresponding one of the floats, and the folding hinge comprises a plurality of mutually hinged folding arms, and two ends of the folding hinge are respectively hinged with the tower foundation and corresponding one of the floats;

wherein the tower is arranged on the floating wind turbine foundation.

6. The floating wind turbine according to claim 5, wherein the floating wind turbine foundation further comprises a controller for receiving weather information, wherein the controller is electrically connected with each of the hydraulic jacks.

7. The floating wind turbine according to claim 5, wherein the floating wind turbine foundation further comprises an inclinometer capable of detecting an inclination angle of a wind turbine, a wind detecting radar capable of detecting a wind speed and a floating sonar measuring device capable of detecting a wave height, wherein the inclinometer, the wind detecting radar and the floating sonar measuring device are all electrically connected with the controller.

8. The floating wind turbine according to claim 5, wherein the floating wind turbine foundation further comprises a water pump for increasing ballast water of the floats.

9. The floating wind turbine according to claim 5, wherein in the floating wind turbine foundation, the tower is of a lifting structure.

10. The floating wind turbine according to claim 9, wherein in the floating wind turbine foundation, the lifting structure comprises lifting driving gears arranged on the tower foundation, and an outer circumference of the tower is provided with lifting teeth capable of being matched with the lifting driving gears.

11. The floating wind turbine according to claim 5, wherein the wind turbine comprises a hub and blades arranged on the hub, and each of the blades comprises a first blade split connected with the hub and a second blade split rotatably connected with the first blade split.

12. An anti-typhoon method, being applied to a floating wind turbine foundation, wherein the floating wind turbine foundation comprises:

a tower foundation;

a plurality of floats arranged around the tower foundation;

telescopic expansion mechanisms, wherein each of the floats corresponds to one of the telescopic expansion mechanisms, and each of the telescopic expansion mechanisms comprises hydraulic jacks and a folding hinge, wherein two ends of each of the hydraulic jacks are respectively hinged with the tower foundation and corresponding one of the floats, and the folding hinge comprises a plurality of mutually hinged folding arms, and two ends of the folding hinge are respectively hinged with the tower foundation and corresponding one of the floats;

wherein the method comprises the following steps:

step S1: when the floating wind turbine is in typhoon condition, extending a telescopic rod of each of the hydraulic jacks, and unfolding the folding hinge to increase the distance between each of the floats and the tower foundation.

13. The anti-typhoon method according to claim 12, wherein the floating wind turbine foundation further comprises a controller for receiving weather information, wherein the controller is electrically connected with each of the hydraulic jacks.

14. The anti-typhoon method according to claim 12, wherein the floating wind turbine foundation further comprises an inclinometer capable of detecting an inclination angle of a wind turbine, a wind detecting radar capable of detecting a wind speed and a floating sonar measuring device capable of detecting a wave height, wherein the inclinometer, the wind detecting radar and the floating sonar measuring device are all electrically connected with the controller.

15. The anti-typhoon method according to claim 12, wherein the floating wind turbine foundation further comprises a water pump for increasing ballast water of the floats.

16. The anti-typhoon method according to claim 12, further comprising, before step S1:

step SA1: receiving the weather information to control a telescopic action of each of the hydraulic jacks according to the weather information.

17. The anti-typhoon method according to claim 16, wherein the step SA1 comprises:

step SA1-1: detecting the inclination angle of the wind turbine through the inclinometer, detecting the wind speed through the wind detecting radar, and detecting the wave height through the floating sonar measuring device;

step SA1-2: when the inclination angle of the wind turbine exceeds a inclination angle threshold, the wind speed exceeds a wind speed threshold and/or the wave height exceeds a wave height threshold, sending out unfolding instructions by the controller;

step SA1-3: after the hydraulic jacks receive the unfolding instructions, extending the telescopic rod of each of the hydraulic jacks.

18. A wind power generation method, comprising an anti-typhoon method, wherein the anti-typhoon method comprises the following steps:

step S1: when a floating wind turbine is in typhoon condition, extending a telescopic rod of each of hydraulic jacks, and unfolding a folding hinge to increase the distance between each of the floats and a tower foundation.

19. The wind power generation method according to claim 18, wherein the anti-typhoon method further comprises, before step S1:

step SA1: receiving weather information to control a telescopic action of each of the hydraulic jacks according to the weather information.

20. The wind power generation method according to claim 19, wherein the step SA1 comprises:

step SA1-1: detecting the inclination angle of the wind turbine through the inclinometer, detecting the wind speed through the wind detecting radar, and detecting the wave height through the floating sonar measuring device;

step SA1-2: when the inclination angle of the wind turbine exceeds a inclination angle threshold, the wind speed exceeds a wind speed threshold and/or the wave height exceeds a wave height threshold, sending out unfolding instructions by the controller;

step SA1-3: after the hydraulic jacks receive the unfolding instructions, extending the telescopic rod of each of the hydraulic jacks.

* * * * *